US012632827B2

(12) United States Patent
Schüthe et al.

(10) Patent No.: US 12,632,827 B2
(45) Date of Patent: May 19, 2026

(54) SYSTEM FOR DIGITALLY REPRESENTING A WAREHOUSE AND/OR MATERIAL STORAGE FACILITY

(71) Applicant: STILL GmbH, Hamburg (DE)

(72) Inventors: Dennis Schüthe, Buchholz (DE); Bengt Abel, Lüneburg (DE); Yan Rudall, Hamburg (DE); Mohamed Bakr, Hamburg (DE)

(73) Assignee: STILL GmbH, Hamburg (DE)

( * ) Notice: Subject to any disclaimer, the term of this patent is extended or adjusted under 35 U.S.C. 154(b) by 35 days.

(21) Appl. No.: 18/838,280

(22) PCT Filed: Feb. 14, 2023

(86) PCT No.: PCT/EP2023/053575
§ 371 (c)(1),
(2) Date: Aug. 14, 2024

(87) PCT Pub. No.: WO2023/156366
PCT Pub. Date: Aug. 24, 2023

(65) Prior Publication Data
US 2025/0148417 A1 May 8, 2025

(30) Foreign Application Priority Data
Feb. 17, 2022 (DE) ..................... 10 2022 103 730.4

(51) Int. Cl.
*G06Q 10/087* (2023.01)
*G06V 20/52* (2022.01)
*G06V 20/64* (2022.01)

(52) U.S. Cl.
CPC ........... *G06Q 10/087* (2013.01); *G06V 20/52* (2022.01); *G06V 20/653* (2022.01)

(58) Field of Classification Search
CPC ...... G06Q 10/087; G06Q 10/08; G06V 20/52; G06V 20/653
See application file for complete search history.

(56) References Cited

U.S. PATENT DOCUMENTS

2018/0215544 A1    8/2018  High et al.
2018/0370727 A1*  12/2018  Hance .................... B25J 19/023
(Continued)

FOREIGN PATENT DOCUMENTS

CN        113286119 A      8/2021
WO     2021216830 A1    10/2021
(Continued)

*Primary Examiner* — Garcia Ade
(74) *Attorney, Agent, or Firm* — The Webb Law Firm

(57) ABSTRACT

A system for digitally representing a warehouse or a material storage facility (1) with a computing unit (1) in which a digital twin (12) of the warehouse and/or material storage facility (1) is created which contains information regarding the warehouse and/or material storage facility (1) that includes position data of infrastructure elements (4) as well as goods (2, 17) and/or materials in the warehouse and/or material storage facility (1). The computing unit (10) has an available computer program with an algorithm that is configured to detect changes in the information data regarding the warehouse and/or material storage facility (1) and, continuously or at regular intervals, to represent a current status of the goods (2, 17) and/or materials in the warehouse and/or material storage facility (1) and to output a current inventory result.

13 Claims, 1 Drawing Sheet

(56)          References Cited

U.S. PATENT DOCUMENTS

2019/0080277  A1 *    3/2019   Trivelpiece ............ G06N 20/00
2021/0309460  A1    10/2021   Kim et al.
2023/0161351  A1 *    5/2023   Prasad ................. G06Q 10/087
                                                     701/28

FOREIGN PATENT DOCUMENTS

WO        WO-2023044484  A1 *   3/2023    ............. G06Q 10/02
WO        WO-2023057749  A1 *   4/2023    ............. B66F 9/063
WO        WO-2023122708  A1 *   6/2023    ........... G06Q 10/087

* cited by examiner

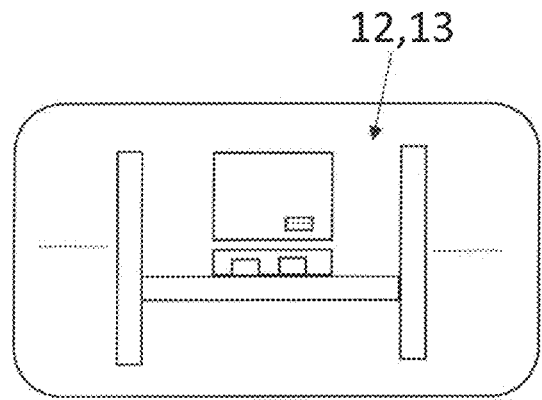
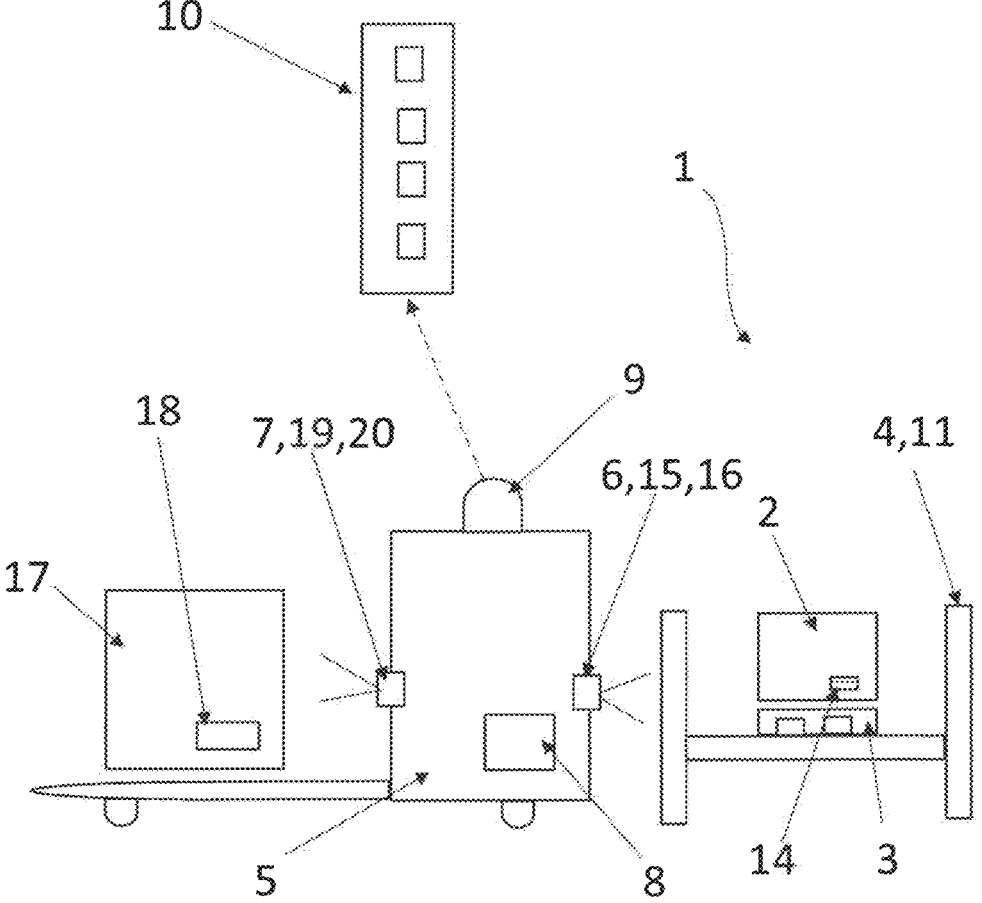

SYSTEM FOR DIGITALLY REPRESENTING A WAREHOUSE AND/OR MATERIAL STORAGE FACILITY

CROSS-REFERENCE TO RELATED APPLICATIONS

This application is the United States national phase of International Patent Application No. PCT/EP2023/053575 filed Feb. 14, 2023, and claims priority to German Patent Application No. 10 2022 103 730.4 filed Feb. 17, 2022, the disclosures of which are hereby incorporated by reference in their entireties.

BACKGROUND OF THE INVENTION

Field of the Invention

The invention relates to a system for digitally representing a warehouse and/or material storage facility with a computing unit in which a digital twin of the warehouse and/or material storage facility is created, which contains information regarding the warehouse and/or material storage facility that includes position data of infrastructure elements as well as of goods and/or materials in the warehouse and/or material storage facility.

Description of Related Art

To track the stock of goods inside a warehouse and/or material storage facility it is known that a marker can be used, for example an RFID tag that can be tracked by means of readers, or a UWB beacon or a label, for example a bar code, that can be read by a scanner. The use of RFID tags to track goods requires the procurement of the corresponding expensive readers. The scanning of a label on the item using a scanner such as a barcode reader, for example, is normally a manual process and must be performed by warehouse personnel.

The intralogistics sector has recently shown increased interest in systems for the digitization of warehouses and/or material storage facilities. A digital twin of a digital representation of the warehouse and/or material storage facility is created in a computing unit. This digital twin contains all the information regarding the warehouse and/or material storage facility in digital form. The digital representation comprises, for example, streets, intersections, signs, goods, materials and infrastructure objects such as shelves, for example.

In intralogistics operations it is also desirable, for inventory purposes, to know the stock of goods and/or materials on hand in a warehouse and/or material storage facility. Because the goods and/or materials in a warehouse and/or materials storage facility are generally moved in and out with a high turnover rate, an inventory frequently does not reflect the actual stock of goods and/or materials on hand at a given point in time.

SUMMARY OF THE INVENTION

The object of this invention is to make available a system that facilitates a determination of the actual stock of goods and/or materials on hand in the warehouse and/or material storage facility. A particular object of this invention is to make available a system that makes possible the capture of the movement of goods without the need for additional equipment, by means of only a digital twin and the mapping of the warehouse and/or material storage facility.

This object is accomplished in a system of the type described above according to the invention in that the computing unit has available a computing program with an algorithm that is designed to recognize changes in the information data regarding the warehouse and/or material storage facility and to provide, continuously or at regular intervals, a digital representation of a current status of the goods and/or materials in the warehouse and/or material storage facility and to output a current inventory result and/or to track the stock.

With the knowledge of the changes of the information data of the digital twin of the warehouse and/or material storage facility, live tracking of the stock becomes possible, as a result of which goods can be identified and any change in their position in the framework of the logistics flow of goods can be tracked without the need for additional equipment and infrastructure expansions.

With this system, it becomes possible to conduct a continuous inventory, in particular to maintain a live inventory, i.e. a real-time inventory, on the basis of the digital twin of the warehouse and/or material storage facility, so that the operator of a warehouse and/or material storage facility can be informed at any time of the current stock of goods and/or material.

With this system, live tracking of the stock in a warehouse and/or material storage facility becomes possible on the basis of the digital twin of the warehouse and/or material storage facility without the need for additional equipment and infrastructure expansions.

In one preferred configuration of the invention, in particular a sensor system is provided which is configured to determine and transmit the information data concerning the warehouse and/or material storage facility to the computing unit continuously or at regular intervals.

The sensor system in particular comprises sensors that are located on at least one industrial truck and/or at least one infrastructure element in the warehouse and/or material storage facility. With this system in particular, a distribution of the sensors over a plurality of industrial trucks is possible, so that a complete representation of the warehouse and/or material storage facility results, which is available practically in real time.

The sensors comprise in particular cameras and/or 3D scanners and/or bar code scanners. In particular, a combination of sensors of different constructions is advantageous because a particularly high level of precision and reliability of the digital representation of the warehouse and/or material storage facility becomes possible with the consolidation of the sensor data from the different sensors.

According to one particularly advantageous configuration of the invention, in particular the information data regarding the warehouse and/or material storage facility is entered in the computing unit in a digital 3D map of the warehouse and/or material storage facility. For this purpose, in particular, the entire 3D space of the warehouse and/or material storage facility can be scanned by means of the sensor system and the sensor data from the sensor system can be analyzed in the computing unit, wherein a virtual grid of the 3D space with cells is generated, and wherein the cells in which objects are detected are labeled as occupied cells and the cells in which no objects are detected or labeled as free cells, as a result of which a representation of the warehouse and/or material storage facility is generated in the digital 3D map.

In particular, the computing program of the computing unit is designed to determine changes in the 3D map continuously or at regular intervals.

The computing program of the computing unit comprises in particular an image processing program that is designed to recognize goods and/or materials that are added and/or removed.

In one preferred development, the computing program of the computing unit comprises a computing program that uses artificial intelligence (AI) and is configured to recognize goods and/or materials that have been added and/or removed.

Additionally or alternatively to the configuration in which a sensor system is provided in the warehouse and/or material storage facility that continuously or at regular intervals acquires information data about the warehouse and/or material storage facility and transmits it directly to the computing unit, information regarding the goods currently being transported by an industrial truck can in particular be used to generate and update the digital twin in the computing unit.

For this purpose, according to an additional embodiment of the invention, at least one industrial truck is provided which has a vehicle sensor system which is designed to acquire information data regarding goods and/or materials located on the industrial truck. The vehicle sensor system is in an operative connection with a vehicle computing unit of the industrial truck. The vehicle computing unit is configured to analyze the sensor data from the vehicle sensor system, to identify the goods and/or material and to determine identification data. The vehicle computing unit is in particular in an operative connection with a data transmission device which is designed to transmit the identification data of the goods and/or materials detected to the computing unit. In this case, the computer program of the computing unit is configured to process the identification data as information data regarding the warehouse and/or material storage facility.

In particular, the vehicle computing unit has an image processing program that is designed to recognize the goods and/or materials located on the industrial truck. One example of conventional image processing might be the recognition of bar codes, for example.

In one preferred development of the invention, the vehicle computing unit has a computing program that uses artificial intelligence (AI) and is configured to recognize the goods and/or materials on the industrial truck. One example of an AI application is in particular the recognition of the goods themselves by means of an artificial neuronal network that was trained on the goods by means of data in the warehouse and/or material storage facility.

In particular, a combination of conventional image processing and artificial intelligence is conceivable.

The identification data regarding the goods and/or materials on the industrial truck can be product-specific and can relate, for example, to a group of goods, a serial number, a material number or similar identifier. This identification data is transmitted directly from the vehicle computing unit to the computing unit, where it is processed as information data and input into the digital twin, i.e. added to the existing information data when an article is placed in inventory and deleted from the existing information data when an article is removed from inventory. Because the position of the industrial truck and of the article located on the industrial truck is known in particular, the position can also be saved for goods put in storage.

The vehicle sensing system for the sensing of the goods and/or materials on the industrial truck comprises in particular at least one vehicle sensor that is in the form of a camera and/or 3D scanner and/or bar code scanner.

According to one development of the invention, the computing program of the computing unit is designed to minimize goods storage times by processing supply chain data. For this purpose, the supply chains are also entered into the computing unit.

As an additional option, the computing program of the computing unit can be configured to optimize itineraries by processing vehicle position data. Because not only the positions of the goods and/or of the materials are known, but also the positions of the vehicles and semi-dynamic objects such as pallets, crates etc., the itineraries of manually or autonomously operated vehicles in the warehouse and/or material storage facility can be optimized. Bottlenecks in the warehouse and/or material storage facility can thus be recognized and the itineraries optimized.

It is further conceivable that the computing program of the computing unit can be designed to organize the restocking of goods by access to a goods purchase order program, for example by means of a graphical user interface which is simultaneously connected with a purchase order server or otherwise with a plug-in, interface or similar device. For this purpose, in particular the individual groups of goods can be assigned a threshold. If the quantity of goods falls below the threshold, new goods can be reordered or the user receives a notification. This can be set, for example, by means of the order server.

By long-term tracking of incoming and outgoing goods, a determination can be made, optimally over a period of time, when a certain quantity or amount of goods must be reordered, because these goods are consumed to a greater extent in the winter than in the summer, for example.

The invention offers a series of advantages:

With the proposed system it is possible to conduct a continuous inventory, in particular a live inventory, in real time. The operator of the warehouse and/or material storage facility is therefore able to continuously represent the current status of the stock of goods and materials.

The goods and/or materials can also be provided with their current positions in the warehouse and/or material storage facility. The operator is therefore able at any time to query the current position of the goods or of the materials in the warehouse. This makes continuous live tracking of the goods possible and therefore live tracking of the stock.

By means of the live tracking of the goods or material, the material flow can be calculated in real time and thereby optimized.

BRIEF DESCRIPTION OF THE DRAWING

The terms Fig., Figs., Figure, and Figures are used interchangeably to refer to the corresponding figure in the drawings, wherein FIG. 1 is a schematic representation of the warehouse and/or material storage facility of the present invention.

Additional advantages and details of the invention are described in greater detail below with reference to the exemplary embodiment illustrated in the accompanying schematic figure.

DESCRIPTION OF THE INVENTION

FIG. 1 shows a warehouse and/or material storage facility 1 with an article 2 which is on a load carrier 3 such as a pallet, for example on a shelf 11 which represents an infrastructure element 4 of the warehouse and/or material storage facility 1. In the warehouse and/or material storage facility 1, there is also at least one industrial truck 5 with a sensor system 6 to monitor the environment and/or a vehicle sensor system 7 to monitor the load. The industrial truck 5 further has a vehicle computing unit 8 and a data transmission device 9 to transmit data to a computing unit 10.

For the digital representation of the warehouse and/or material storage facility 1, a digital twin 12 of the warehouse and/or material storage facility 1 is generated in the computing unit 10 and contains information data about the warehouse and/or material storage facility 1, which comprises position data of the infrastructure element 4 and of the items 2 in the warehouse and/or material storage facility 1. The information data is stored, for example, in a 3D map 13 of the warehouse and/or material storage facility 1 that the digital twin 12 represents.

Changes in the current, actual status of the items in the warehouse and/or material storage facility 1 can be read from changes in the digital twin 12. In this manner, the inventory in the warehouse and/or material storage facility 1 can be tracked continuously so that it becomes possible to keep a live inventory and to track the goods 2 inside the warehouse and/or material storage facility 1.

For this purpose, the computing unit 10 has an algorithm that is designed to recognize changes in the information data concerning the warehouse and/or material storage facility 1 and to digitally represent, continuously or at regular intervals, a current status of the items 2 in the warehouse and/or material storage facility 1 and output a current inventory result and/or to track the stock.

Two variants of the system for the digital representation of the warehouse and/or material storage facility 1 are described below.

Variant 1

This variant relates to the digital twin 12, which is regularly updated.

The method here is described below:

In the computing unit 10, the information for the 3D map 13, based on the sensor data from the sensor system 6, which has, as a sensor 15, a camera 16 and/or a 3D scanner and/or a bar code scanner, for example, wherein the sensor data is transmitted from the industrial truck 5 to the computing unit 10, is compiled and processed and stored in the digital 3D map 13. The inventory is prepared and the stock is tracked on the basis of this digital 3D map 13. If something changes in the 3D map 13, it must be assumed that an article 2 was moved, because the infrastructure element 4 does not change during operation. Therefore, the computing unit 10 is triggered and the algorithm that detects changes in the area is started. A comparison with the 3D map at a previous point in time shows which article 2 was added or removed. This can be done by means of artificial intelligence and/or conventional image processing, for example. A targeted search is thereby conducted for the article 2, as well as a bar code 14 on the article 2. For this purpose, a comparison is made of what articles 2 were there previously and how many. By means of this comparison it can be determined which articles 2 have been removed and which articles 2 may have been newly added. Warehouse management is thereby fully automated.

Variant 2

The computing unit 10 stores the information about the articles 2 and their position in the 3D map. The vehicle computing unit 8, which is located on the industrial truck 5 and is in communication with the computing unit 10 via the data transmission device 9, preferably over a wireless connection, processes the information about the article 17 which is currently being transported by means of the industrial truck 5.

The article 17 on the industrial truck 5 is detected by means of the vehicle sensor system 7, which has a camera 20, for example, as the sensor 19. The vehicle sensor system 7 is in communication with the vehicle computing unit 8 of the industrial truck 5. The vehicle computing unit 8 is thereby designed to analyze the sensor data from the vehicle sensor system 7 and to identify the article 17 and determine data identifying the article 17.

For example, the article 17 can be identified by means of AI algorithms and/or conventional image processing. One example of an AI application in this case is the recognition of the article 17 itself by means of a neuronal network that was trained on the article 17 by means of data. One example of conventional image processing might be the recognition of a bar code 18 on the item 17. A combination of the two methods is also conceivable.

The identification data of the article 17 detected is transmitted to the computing unit 10. In the computing unit 10, the identification data is processed as information data regarding the warehouse and/or material storage facility 1.

The identification data of the article 17 recognized is product-specific and relates, for example, to a product group, a serial number, a material number etc., as well as the quantity of the article. An inventory can be taken on the basis of the identification data. The identification data of the article 17 recognized is sent directly from the vehicle computing unit 8 to the computing unit 10 where it is entered into the data, i.e. added when the article 17 is placed in storage and removed when the article 17 is removed from storage. Because the position of the industrial truck 5 and of the article 17 located on the industrial truck 5 are known, they can also be saved for stored articles.

In both variants, the operator of the warehouse and/or material storage facility 1 has a live overview of the flow of goods and materials in the warehouse and/or material storage facility 1.

The two methods described above can also be combined with each other.

Stock Tracking

Stock tracking is based on the 3D map 13 of the warehouse and/or material storage facility 1 described above, wherein the materials in stock are identified by means of the 3D map 13. Additionally or optionally, the materials in stock on the 3D map 13 can also be synchronized with a warehouse management system.

For this purpose, preferably every item 2, 17 is associated with an ID. This can be created by means of the process described below:

For example, the association of an ID with an item 2, 17 can be done by means of image features, for example via an AI-based feature extractor. The features are thereby unique each time so that the item 2, 17 can be recognized again.

Alternatively, the reading of a label such as the bar code 14, 18, on the item 2, 17, can be used to identify the item 2, 17.

Alternatively, by integration into a warehouse management system, the master data can be reconciled to further identify the item 2, 17, i.e. to determine exactly what the item is.

For stock tracking, the memory of the 3D map 13 is expanded to include the temporary storage of the status, i.e.

a time interval of x minutes is selected in which a status of the 3D map 13 is saved with the time stamp. The item 2, 17 can thereby be tracked by means of the ID in the 3D maps 13 by the different time stamp.

The interval of time in which the status of the 3D map 13 is stored can preferably be specified by the operator of the warehouse and/or material storage facility 1, so that it is possible to represent targeted flows of goods over the necessary period of time. In a warehouse and/or material storage facility 1 with high turnover, the time interval can be one hour, for example. In a warehouse and/or material storage facility 1 with low turnover, the time interval can be days, weeks, or months, for example. The time intervals are captured based on the time interval specified by the operator. For example, if the warehouse and/or material storage facility 1 in question has low turnover, it is not necessary to save an image of the 3D map every minute. Instead, in this case, it may be adequate to save the 3D map 13 once a day, for example.

However, the time interval should not be less than a minimum of 10 minutes.

Preferably the time interval can be selected as a function of a projected flow of goods and/or in particular adapted in the event of a change in the projected flow of goods.

Particularly preferably, the time interval can be a maximum of one year or six months or three months or one month or two weeks or one week or three days or one day or twelve hours or 10 hours or six hours or three hours or one hour or 30 minutes or 15 minutes or ten minutes. Particularly preferably, the interval can be a minimum of six months or three months or one month or two weeks or one week or three days or one day or twelve hours or 10 hours or six hours or three hours or 30 minutes or 15 minutes or ten minutes. Alternatively, the time interval can be approximately five minutes or one minute.

The temporary saving described above of the 3D map 13 can be supplemented and/or replaced by a condition-based saving of the 3D map 13. Because the features of the individual goods 2, 17 are known and have a semantic instance segmentation, the 3D map 13 can be saved every time there is a change. For example, if a pallet 3 with an item 2, 17 remains in one place for a relatively long time, this condition is recorded only once. If the pallet 3 is moved, the new condition plus the time stamp is recorded. Therefore, the tracking rate is dynamically adapted to the situation in the warehouse and/or material storage facility 1.

With stock tracking of this type, it becomes possible to display product flows of individual items 2, 17 in the warehouse and/or material storage facility 1. Product flows of specific items 2, 17 can also be displayed if the items are identified by integration with the warehouse management system or by means of labels on the goods. A superimposition of product flows over time can also be used for the visual representation of high-traffic and potentially overloaded routes. Empty load carriers can also be detected and goods for these areas can be re-ordered. Defective load carriers and/or defective goods can also be recognized.

With stock tracking of this type based on the digital twin 12 or the 3D maps of the warehouse and/or material storage facility 1, no modification of the infrastructure is necessary for stock tracking.

With stock tracking of this type, the inventory delta between the warehouse management system and the actual stock in the warehouse can also be minimized by the detection of understocked goods, stock that is unusable on account of damage, for example, and of overstocks.

Additionally, a fine-mesh imaging of the flow of goods in the warehouse and/or material storage facility 1 can be achieved, and thus a generation of the "actual value" of the stock that can be managed in the framework of regulation and control processes to improve the performance or reliability of the process.

The invention claimed is:

1. A system for the digital representation of a warehouse and/or material storage facility comprising:

one or more infrastructure elements located in the warehouse and/or material storage facility;

one or more industrial trucks located in the warehouse and/or material storage facility;

a sensor system having at least one sensor located on at least one industrial truck of the one or more industrial trucks and at least one sensor located on at least one infrastructure element of the one or more infrastructure elements, and a computing unit comprising a computing program having an algorithm, wherein the sensor system acquires, continuously or at regular intervals, information data regarding the warehouse and/or material storage facility and transmits the information data to the computing unit, wherein the information data comprises position data of at least one of: the one or more infrastructure elements, the one or more industrial trucks, and goods and/or materials in the warehouse and/or material storage facility, or a combination thereof, wherein the computing unit receives the information data from the sensor system, and the computing program, based on the algorithm and the information data received by the computing unit, generates a digital twin of the warehouse and/or material storage facility and stores the information data in the digital twin, wherein the computing program detects changes in the information data acquired by the sensor system and transmitted to the computing unit continuously or at regular intervals, and updates the digital twin based on the changes in the information data, wherein the computing program, based on the information data, the changes in the information data, and the digital twin, generates a digital representation of a current status of the goods and/or the materials in the warehouse and/or material storage facility and outputs a current inventory result and/or tracks stock based on the digital representation.

2. The system according to claim 1, wherein the at least one sensor comprises cameras and/or 3D scanners and/or bar code scanners.

3. The system according to claim 1, wherein the information data regarding the warehouse and/or material storage facility is stored in a digital 3D map of the warehouse and/or material storage facility, as the digital twin, in the computing unit.

4. The system according to claim 3, wherein the computing program of the computing unit is configured to detect changes in the 3D map continuously or at regular intervals.

5. The system according to claim 1, wherein the computing program of the computing unit comprises an image processing program that is configured to recognize goods and/or materials that have been added or removed.

6. The system according to claim 1, wherein the computing program of the computing unit comprises a computer program with artificial intelligence program that is configured to recognize goods and/or materials that have been added or removed.

7. The system according to claim 1, wherein at least one industrial truck of the one or more industrial trucks comprises a vehicle sensor system configured to detect goods and/or materials located on the at least one industrial truck, wherein the vehicle sensor system is in effective communication with a vehicle computing unit of the at least one industrial truck, the vehicle computing unit is configured to receive and analyze sensor data from the vehicle sensor system, identify the goods and/or the materials, and determine identification data associated with the identified goods and/or the identified materials, and the vehicle computing unit is in operative communication with a data transmission device configured to transmit the identification data of the recognized identified goods and/or of the identified materials to the computing unit, and wherein the computing program of the computing unit is configured to process the identification data as the information data regarding the warehouse and/or material storage facility.

8. The system according to claim 7, wherein the vehicle computing unit has an image processing program, which is configured to recognize the goods and/or materials located on the industrial truck.

9. The system according to claim 7, wherein the vehicle computing unit has a computer program with artificial intelligence, which is configured to recognize the goods and/or the materials located on the industrial truck.

10. The system according to claim 7, wherein the vehicle sensor system comprises at least one vehicle sensor, which is in the form of a camera and/or 3D scanner and/or bar code scanner.

11. The system according to claim 1, wherein the computing program of the computing unit is configured to minimize storage times by processing supply chain data.

12. The system according to claim 1, wherein the computing program of the computing unit is configured to optimize itineraries by processing vehicle position data.

13. The system according to claim 1, wherein the computing program of the computing unit is configured to organize warehouse restocking by accessing a goods purchase ordering program.

\* \* \* \* \*